(12) United States Patent
Aström et al.

(10) Patent No.: US 6,196,770 B1
(45) Date of Patent: Mar. 6, 2001

(54) INDEXIBLE CUTTING INSERT FOR END MILLS

(75) Inventors: Magnus Aström; Lars-Ola Hansson, both of Sandviken (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/305,464

(22) Filed: May 6, 1999

(30) Foreign Application Priority Data

May 6, 1998 (SE) .................................................. 9801576

(51) Int. Cl.$^7$ .............................. B23C 5/20; B23B 27/22
(52) U.S. Cl. ............................. 407/40; 407/43; 407/47; 407/114
(58) Field of Search .................. 407/40, 43, 47, 407/113, 114, 115, 116

(56) References Cited

U.S. PATENT DOCUMENTS

| | | | |
|---|---|---|---|
| 5,199,827 | * | 4/1993 | Pantzar .............................. 407/114 X |
| 5,486,073 | * | 1/1996 | Satran et al. ......................... 407/113 |
| 5,597,271 | * | 1/1997 | Men et al. ............................ 407/113 |
| 5,634,745 | * | 6/1997 | Wiman et al. .................... 407/114 X |
| 5,810,519 | * | 9/1998 | Vogel et al. .......................... 407/114 |

FOREIGN PATENT DOCUMENTS

| | | | |
|---|---|---|---|
| 0 416 901 | | 3/1991 | (EP) . |
| 0457488 | * | 11/1991 | (EP) ..................................... 407/113 |

* cited by examiner

Primary Examiner—Henry Tsai
(74) Attorney, Agent, or Firm—Burns, Doane, Swecker & Mathis, L.L.P.

(57) ABSTRACT

A cutting insert includes a top chip face, a bottom surface and side faces extending therebetween. At each of the end faces the cutting insert has axially protruding portions, each of which having a bevel. Main cutting edges are provided by the intersection between the top face and respective side surfaces. On each side surface there is provided a clearance portion formed on a protruding portion of the insert body which via a step extends into a secondary helically twisted clearance surface, the chip angle of which increases with increasing cutting depth. With the cutting insert viewed in plan, the bevel is oriented perpendicularly to the main cutting edge.

12 Claims, 5 Drawing Sheets

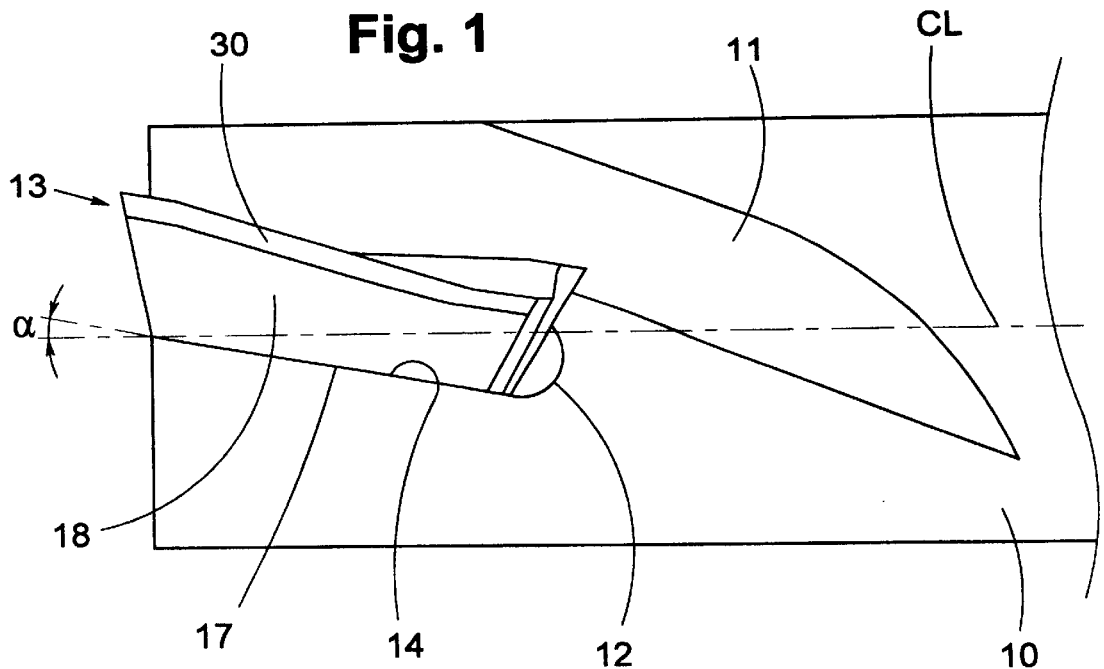
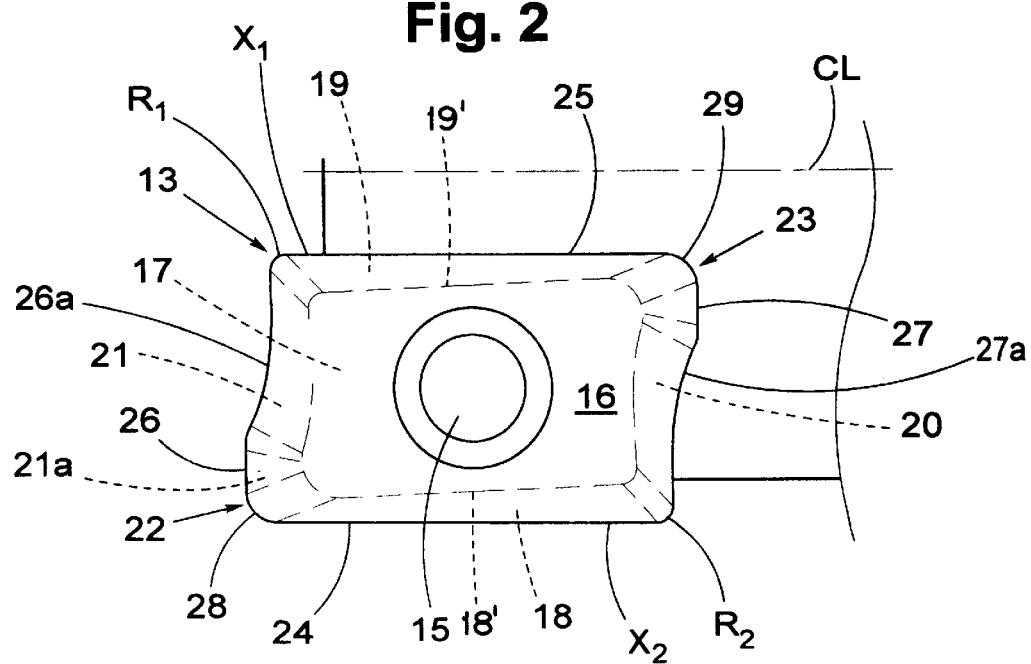

ND MILLS

BACKGROUND OF THE INVENTION

The present invention relates to an elongated cutting insert for application in rotary end mills for machining of metallic workpieces. In particular the invention relates to a cutting insert for end mills in order to be able to machine a 90-degree shoulder with greater precision.

The development of milling inserts for end mills generally manufactured through form-pressing and sintering of a cutting material-forming powder is concentrated today on positive cutting edges having positive rake angles since these have showed the ability to reduce the cutting forces and the power supply needed in a tooling machine while at the same time diminishing undesirable vibrations. It is often aimed to provide the tool with a geometry having a positive axial angle and simultaneously a negative radial angle. In certain cases also a combination of positive axial angle and zero degree radial angle can be used in order to obtain a helical chip that provides the best chip transport. The cutting insert is usually clamped with a center locking screw in order to provide the best possibilities for chip transport without problems.

One of the drawbacks with existing usual indexible inserts for end mills has been that they do not enable, with desired exactitude, the machining of a 90-degree shoulder of a workpiece. The problem with this type of machining is that the workpiece wall does not become wholly straight. As a solution to this problem it has been proposed to use a cutting insert, the cutting edges of which are spirally curved. EP-A-416 901 shows and describes such a tool. With such spiral cutting edges the cutting edge can more easily come into engagement with the workplace with an inclined curve of the cutting force up to a maximum value which lies under that achieved with a straight cutting edge. The tool has in this way obtained a somewhat better stability at the same time as the tendency of tool vibrations has been somewhat diminished.

In view hereof it is a purpose with the invention to achieve a modified cutting insert of the type described in EP-A-416 901, with improved geometrical optimization, implying constant functional edge angle in combination with step clearance along a wave-shaped edge line intended to be mounted with large axial inclination in the tool.

It is another purpose to achieve a milling tool, which is useful both for machining of a 90-degree shoulder and for axial machining (so-called ramping), i.e. a tool which machines the workpiece in both axial and radial directions.

SUMMARY OF THE INVENTION

The present invention relates to an indexible cutting insert for chip forming machining. The insert comprises a basically parallelogram shaped body including a top face, a planar bottom surface, two longitudinal side surfaces intersecting the top face to form respective main cutting edges, and two end faces each having a bevel provided on a portion of the body protruding longitudinally from the remainder of the body. Each of the side surfaces has a width which increases toward a respective active cutting corner of the insert, such that the active cutting corner is raised. The side surfaces are generally inclined at an acute angle towards the top face and at an obtuse angle toward the bottom surface. An upper portion of each of the side surfaces comprises a wave-shaped primary clearance surface extending along the entire respective main cutting edge at a downward inclination from one end face toward the other end face. The primary clearance surface is provided on a portion of the body extending laterally from the remainder of the body. Each primary clearance surface forms a step with a lower portion of the respective side surface. The lower portion of each side surface comprises a secondary helically twisted clearance surface, the rake angle of which increases with increasing cutting depth. The bevels are separated from the main cutting edge by a smoothly curved edge portion.

The invention also pertains to a tool comprising a cylindrical tool body on which a plurality of the cutting inserts are mounted.

BRIEF DESCRIPTION OF THE DRAWINGS

The objects and advantages of the invention will become apparent from the following detailed description of a preferred embodiment thereof in connection with the accompanying drawing, in which like numerals designate like elements, and in which:

FIG. 1 shows a side view of a milling body with a clamped, cutting insert according to the invention;

FIG. 2 shows another partial side view of the tool according to FIG. 1;

DETAILED DESCRIPTION OF A PREFERRED EMBODIMENT OF THE INVENTION

Figure 3:
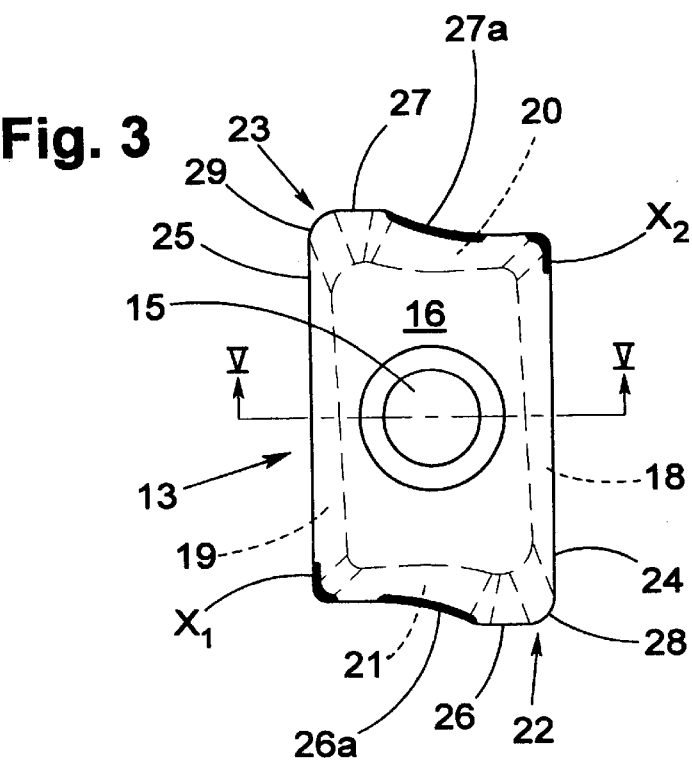
FIG. 3 shows a plan view of the cutting insert according to the invention.

In FIGS. 1–2 there is illustrated an embodiment of an end mill, which is provided with a prismatic elongated indexible insert 13 according to the invention. Such a cutting insert is produced by means of a direct pressing method in which a cemented carbide forming powder first is given desired shape in a press and then is sintered in an oven at a temperature above 1000° C. The shrinking obtained during the sintering is something that must be compensated for by a suitable dimensioning of the press device. The end mill comprises an essentially cylindrically shaped body 10, the rear upper part (not shown) of which is conical and intended to be clamped in a driver such as a chuck or spindle of a tooling machine by means of which the body can be brought to rotate around a center axis CL. The forward part of the end mill has a number of spaced recesses 11 extending around the periphery, each of which has a pocket 12 confined by a bottom support surface 14 and one or more side supporting surfaces upstanding therefrom to receive a releaseably clamped indexible insert 13 in a work position therein. Alternatively, a number of cutting inserts can furthermore be piled axially in matching pockets in said milling body.

The bottom surface 1a of said pocket 12 forms a positive axial angle a with a longitudinal axis simultaneously as it forms a negative radial angle with a radial plane. The indexible insert 13 is preferably intended to be fastened in said pocket 12 by means of a clamp screw (not shown) which is received through a central aperture 15 of the insert and threadably engaged in the milling body 10. The size of this positive axial angle a should be greater than 0° and not greater than 20°, suitably 5–15°. The positive axial angle α will enable the chips to be easily lifted and thrown away from the workpiece.

The indexible insert 13 is essentially formed as a parallelogram, including a top face 16 and a bottom surface 17. Between the top face 16 and the bottom surface 17 extend two longitudinal side surfaces 18, 19 and two end faces 20, 21. Each of the side surfaces 18, 19 intersects the top face 16 and the bottom surface 17 to form respective edges 24, 18'(or 25, 19') that extend non-parallel to one another as the insert is viewed in a direction toward the top surface (see FIG. 2).

The side surfaces 18,19 have considerably larger longitudinal extensions (lengths L) than the laterally extending end faces 20, 21. These side surfaces 18, 19 are generally inclined at an acute angle relative to the top face 16 and at an obtuse angle relative to the bottom surface 17. The side surfaces are oriented perpendicular to the end faces. The end faces form diametrically opposite corners 22, 23, which protrude axially from the remainder of the insert body. Each of the intersection lines between the side surface 18 or 19 and the top surface 16 of the cutting insert forms a main cutting edge 24 or 25, whereas the intersections between the corners 22, 23 and the top surface 16 constitute bevels 26 and 27 formed essentially right-angled in relation to said main cutting edges. The bevels 26 and 27 are formed on said protruding corners 22 and 23, respectively, and are intended to plane out the machined surface and achieve an improved surface finish on the workpiece. The main cutting edges and said bevels are separated from one another at each corner by smoothly rounded corner edges 28 and 29 respectively, the curvature of which is chosen such that during machining of the workpiece a curved portion with radius 0.4–6.4 mm is obtained on the workpiece. In order to attain this, the corner edges 28, 29 have such a shape that the radius closest to the straight main cutting edge and to the bevels 26, 27 is somewhat larger than the curved portion therebetween.

As is best shown for example in FIG. 3 there is a smoothly curved edge portion 27a located adjacent to the bevel face 27. This edge portion 27a is intended to be an active cutting edge during axial ramping and drilling. The radius of this curved edge portion 27a becomes successively bigger at positions more remote from the bevel face 27. A similar curved edge portion 26a is located adjacent to the bevel face 26. A separate ramping edge X1 or X2 is provided in connection to a curved edge R1 or R2 which forms a transition to the portion 26a or 17a. The radius of the cutting edge R1 and R2 should be 0.4–0.6 mm.

Figure 4:
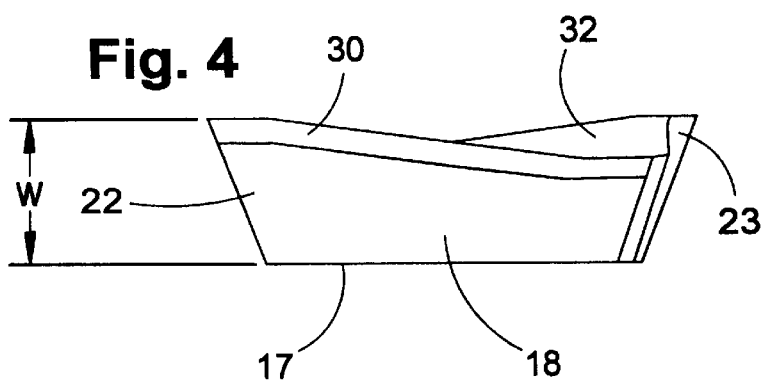
FIG. 4 shows a side view of the cutting insert in FIG. 3.
Figure 5:
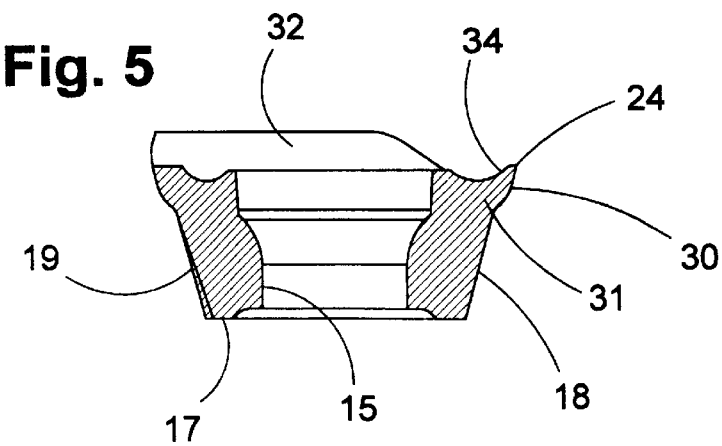
FIG. 5 shows a sectional view along line V—V in FIG. 3.

It is distinguishing that the longitudinal side surfaces 18, 19 are designed with increasing width W (height) towards the active cutting corner so that the active cutting corner and the curved corner edge 28 or 29 become situated on an elevated portion of the cutting insert, as can be seen in FIG. 4. The cutting insert is formed such that both the side surfaces 18, 19 and the end faces 20, 21 appear with positive clearance angle along the entire cutting edge in relation to the top face 16 of the cutting insert. It is furthermore distinguishing that the longitudinal side surfaces 18, 19 of the cutting insert, as viewed from the side (FIG. 4), have wave-shaped primary clearance surfaces 30 extending along the entire main cutting edge 24 (similarly along the main cutting edge 25), with a large downward axial inclination from one edge face towards the other end face 20. It is to be noticed from FIG. 5 that this primary clearance surface 30 is provided on a portion 31 of the insert body that is protruding laterally from the remainder of the insert body which via a step clearance with a certain radius extends into a secondary helically twisted clearance surface 18' or 19' of the side surface 18 or 19, formed such that its clearance angle increases with increasing cutting depth. The primary clearance surface 30 is formed with essentially constant width along its entire length.

Figure 6:
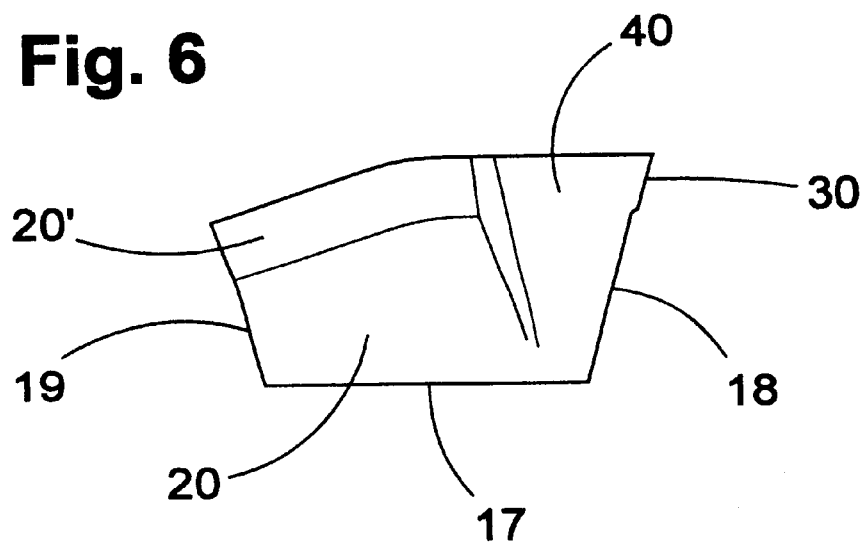
FIG. 6 shows an end view of the cutting insert in FIG. 1.
Figure 7:
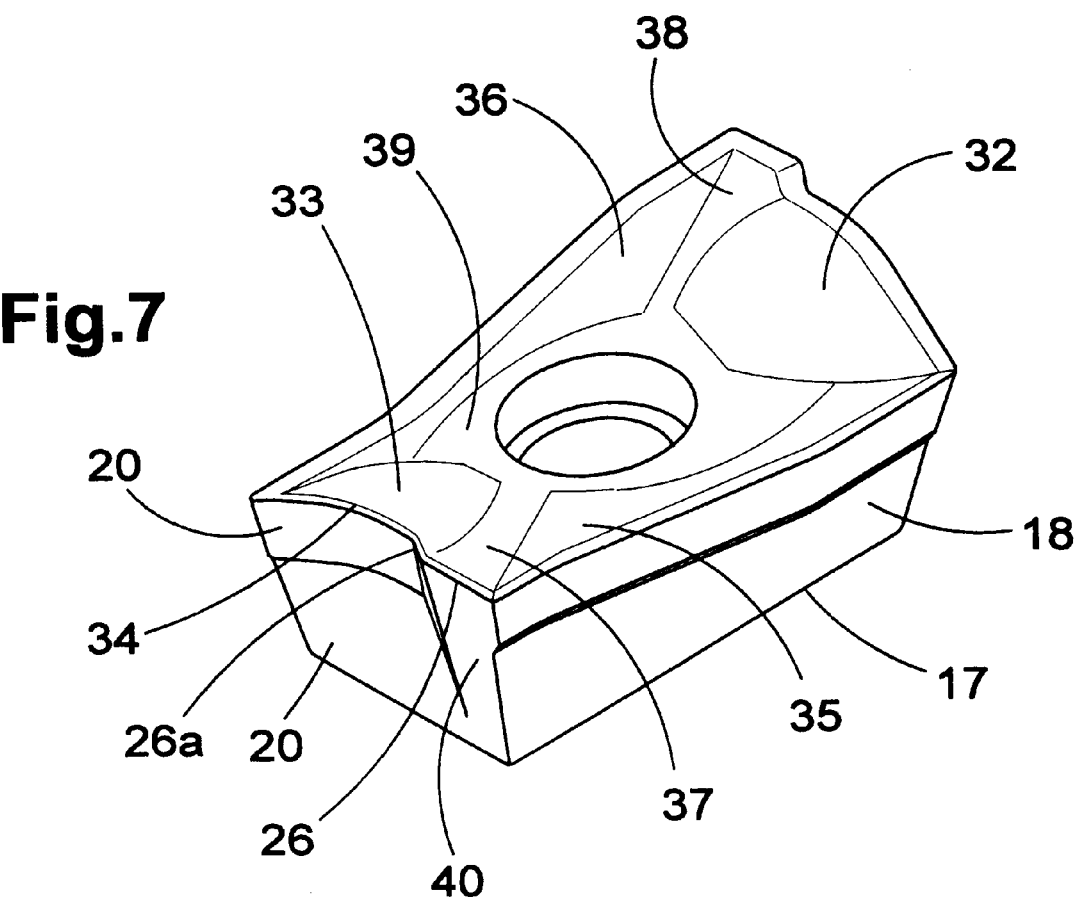
FIG. 7 shows a perspective view of the cutting insert in FIG. 1.

The detailed form of the top face 16 of the insert appears more clearly in FIGS. 6–7. Hence, the top face has a recessed central region around the center hole 15. From this region and in directions towards both end faces, curved first rake surfaces 32 and 33 are extending. As is best shown in FIG. 7, the top face is confined by a circumferentially extending planar reinforcing chamfer 34, the width of which has been enlarged for clarification purpose. This chamfer 34 forms along the main cutting edge an acute angle α with the primary clearance surface 30 such as shown in FIGS. 6–10, suitably in the magnitude of 75–90°, preferably 84–89°. The reinforcing chamfer 34 along the bevels 26, 27 shall, however, form a sharper angle with the clearance surface 21a located next to the bevels 26, 27. This sharper angle should lie in the area 70–80°. Those rake surfaces of the top face which connect to and form an intersection with the longitudinal side surfaces 18, 19, have the form of obliquely upwards inclined essentially planar second surfaces 35 and 36. Between the rake surfaces 33 and 35 there is provided a substantially planar third surface 37 that is recessed in relation to its surrounding surfaces, said surface 37 being inclined downwards whilst having an increasing width up to the corners. In a corresponding manner there is a similar narrow surface 38 inclined downwards towards the insert center in diametrically opposite position to the surface 37. Both of these narrow surfaces 37, 38 connect downwardly to a recessed planar surface 39 which surrounds the center hole 15. The surface 37 is parallel with the bottom surface 17. Thanks to this arrangement with alternating raised and recessed surface parts in near connection to the active cutting corner, it has become possible to achieve a favorable optimized form of the chip shape such that it is more easily broken up and can be removed more easily from the workpiece. Such as also shown in FIGS. 6–7, the upper part of the end face 20 is formed as a clearance surface 20', which at an acute angle forms an intersection with the upper reinforcing chamfer 34. The surface portion 40 of the end face 20, which connects to the secondary cutting edge 26, has however, the shape of a planar surface, which extends as an unbroken surface from the top face 16 to the bottom surface 17.

Figure 8:
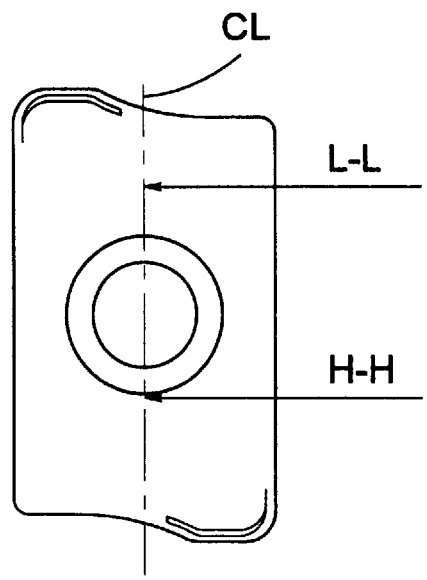
FIG. 8 shows a plan view of the cutting insert.
Figure 9:
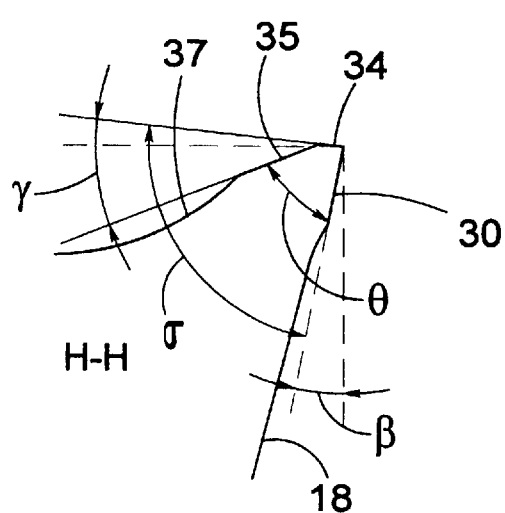
FIG. 9 shows a sectional view along line H—H in FIG. 8.
Figure 10:
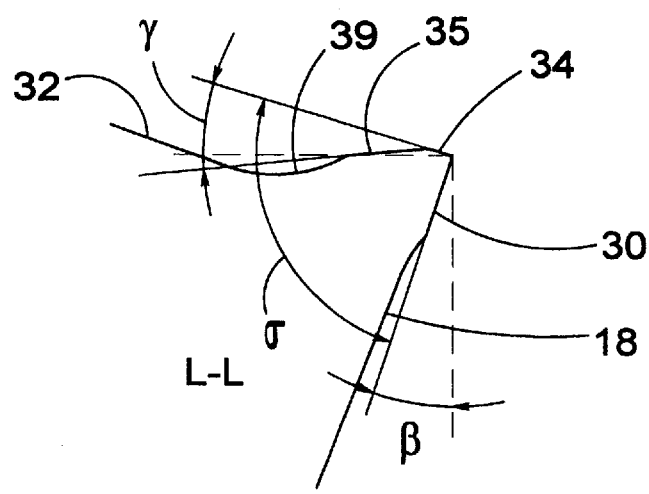
FIG. 10 shows a sectional vie w along line L—L in FIG. 8.

In FIGS. 8–10 is illustrated the cutting insert by a number of sectional views, wherefrom the contour of the top face 16 appears more clearly. The helically twisted contour of the upper reinforcing chamfer 34 and its connecting chip surface 35 along the main cutting edge 24 appears therefrom as well as a corresponding helically twisted form of the primary clearance surface 30. In this manner it will be apparent that the angle β constitutes the clearance angle between the primary clearance surface 30 and a normal to the bottom surface 17. That angle β varies such that it becomes smaller in the section H-H and then appears with a larger value in the section L-L. The size of the angle β should be greater than 0° and not greater than 25°. This means that after being functionally secured in the milling body there is obtained a constant clearance angle which makes the chamfer wear become even. The rake angle y, however, remains constant. The symbol θ designates the angle between the surfaces 30 and 35 and σ designates the angle between the surfaces 34 and 30. It follows herefrom that the angles y, θ and σ remain constant in all cross sections along the main cutting edge. There is thus always achieved a uniform chip formation along each cross section along the main cutting edge which gives increased edge strength that contributes to extended tool life of the cutting insert.

Figure 11:
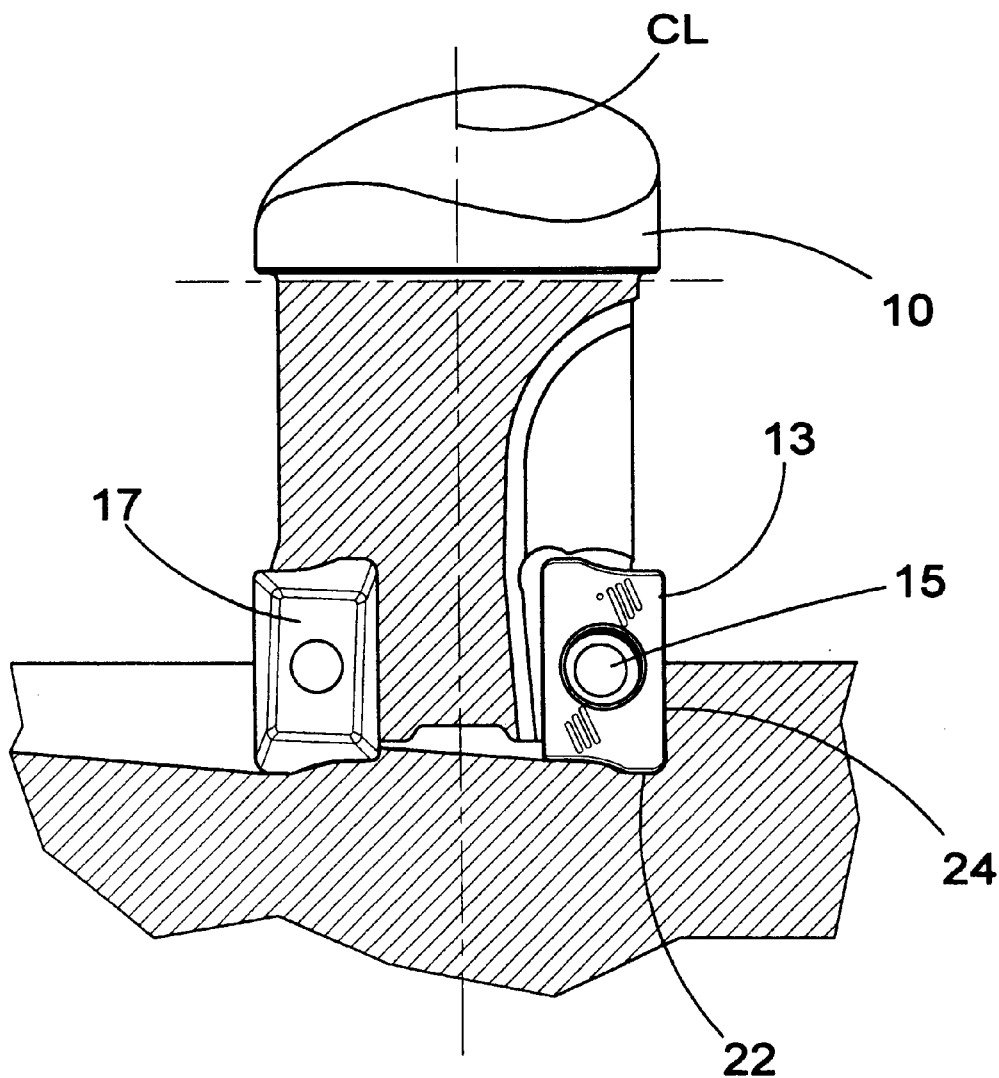
FIG. 11 shows a side view of a milling body at machining in both axial and radial direction.

In FIG. 11 is shown how the milling tool with a cutting insert according to the invention becomes useful for a ramping operation such that a ramped surface with a certain inclination angle, obliquely downwards to the right in the figure, becomes possible. The cutting edges that are operative are designated more darkly in FIG. 3 and are designated X1, X2 as well as 27a, 27b.

Thanks to the arrangement described above with a constant functional edge angle along a wave-shaped edge line combined with step clearance and a large positive axial angle α, it has become possible to establish desired precision when providing a 90-degree shoulder of the workpiece. An even chamfer wear is attained along the main cutting edge, which adds to extended tool life. Simultaneously the chip formation becomes favorable, and machining can occur with moderate cutting forces. Furthermore, such a tool has turned out to manage appropriate machining by circular interpolation such that a ramped surface with an inclination angle up to about 10° becomes possible. Another effect is that increments of notch or spark wear appearing on the cutting edge are limited. Thereby, the drawback relating to increased cutting forces during machining is reduced, contributing to increased tool life.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. Indexible cutting insert for chip forming machining, comprising a basically parallelogram shaped body including a top surface, a planar bottom surface, two longitudinal side surfaces intersecting the top surface to form respective main cutting edges therewith, and two end faces each having a bevel provided on a portion of the body protruding longitudinally from the remainder of the body, each of the side surfaces having a width increasing toward a respective active cutting corner of the insert such that the active cutting corner is raised, the side surfaces being generally inclined at an acute angle toward the top face and at an obtuse angle toward the bottom surface, an upper portion of each of the side surfaces comprising a wave-shaped primary clearance surface extending along the entire respective main cutting edge at a downward inclination from one end face toward the other end face, the primary clearance surface being provided on a portion of the body extending laterally from the remainder of the body, each primary clearance surface forming a step with a lower portion of the respective side surface, the lower portion of each side surface comprising a secondary helically twisted clearance surface, the upper portion of each side surface defining a clearance angle with a normal to the bottom surface, the clearance angle increasing in size as a distance from the respective active cutting corner increases, the bevels being separated from the main cutting edge by a smoothly curved edge portion.

2. Indexible insert according to claim 1, wherein each primary clearance surface has a substantially constant width along the entire respective main cutting edge, and the primary clearance surfaces extending along the entire side surface between the two opposed end faces.

3. Indexible insert according to claim 1, wherein the top surface is confined by a recessed central region and by chip surfaces extending around the central region, some of the chip surfaces disposed adjacent the end faces and forming convex first surfaces, others of the chip surfaces disposed adjacent the side surfaces and comprising obliquely upwardly inclined essentially planar second surfaces which intersect at an acute angle with the respective primary clearance surfaces located adjacent the main cutting edges.

4. Indexible insert according to claim 1, wherein each of the side surfaces intersects the top surface and the bottom surface to form respective edges that are non-parallel as the insert is viewed in a direction toward the top surface.

5. Indexible insert according to claim 1, wherein planar reinforcing chamfers are provided along the main cutting edges and along the bevels.

6. Indexible insert according to claim 5, wherein each planar reinforcing chamfer and the respective primary clearance surface form therebetween an angle of 84–89° along the entire main cutting edge.

7. Indexible insert according to claim 3, wherein between each of the first surfaces and a respective one of the second surfaces there is provided a recessed, essentially planar third surface having a width that increases towards a respective corner of the body.

8. Indexible insert according to claim 3, wherein an upper part of each end face is formed as an inclined clearance surface at the portion adjacent the respective convex chip surface, and a portion of the end face disposed adjacent a respective bevel has the shape of a planar surface extending as an unbroken surface between the top surface and the bottom surface.

9. Indexible insert according to claim 5, wherein an angle formed between each reinforcing chamfer and a respective clearance surface for the bevel is smaller than an angle formed between the reinforcing chamfer and the clearance surface along the main cutting edge.

10. Indexible insert according to claim 1, wherein each of the active cutting corners has a first curved portion joined to the nearest main cutting edge, a second curved portion joined to a respective bevel, and a third curved portion interconnecting the first and second curved portions.

11. Milling tool for rotary machining of metallic workpieces, the tool having a cylindrical tool body rotatable around a center axis, a rear part of the tool body provided with a shank portion adapted to be rotatably clamped in a driver, a periphery of the tool body having a number of circumferentially spaced recesses, each recess confined by a bottom support surface and at least one side support surface upstanding therefrom that extends in axial and radial directions, the tool further comprising indexible inserts releasably clamped in the tool body, each insert comprising a basically parallelogram shaped insert body including a top surface, a planar bottom surface, two longitudinal side surfaces intersecting the top face to form respective main cutting edges therewith, and two end faces each having a bevel provided on a portion of the body protruding longitudinally from the remainder of the insert body, each of the side surfaces having a width increasing toward a respective active cutting corner of the insert such that active cutting corner is raised, the side surfaces being generally inclined at an acute angle toward the top face and at an obtuse angle toward the bottom surface, an upper portion of each of the side surfaces comprising a wave-shaped primary clearance surface extending along the entire respective main cutting edge at a downward inclination from one end face toward the other end face, the primary clearance surface being provided on a portion of the insert body extending laterally from the remainder of the insert body, each primary clearance surface forming a step with a lower portion of the respective side surface, the lower portion of each side surface comprising a secondary helically twisted clearance surface, the upper portion of each side surface defining a clearance angle with a normal to the bottom surface, the clearance angle increasing in size as a distance from the respective active cutting corner increases, the bevels being separated from the main cutting edge by a smoothly curved edge portion, each insert oriented to form a positive axial angle and a negative radial angle.

12. Milling tool according to claim 11, wherein the cutting inserts are axially secured in the tool body such that they extend axially beyond the tool body to such extent that an axially oriented ramping edge of the insert can come into engagement with a workpiece while a curved radial edge located radially inside the bevel can come in engagement with the workpiece during combined ramping and drilling.

* * * * *